United States Patent [19]

Harada et al.

[11] Patent Number: 4,661,547

[45] Date of Patent: Apr. 28, 1987

[54] ANTISTATIC MATERIAL COMPRISING (A) QUATERNARY AMMONIUM SALT (B) PEG HAVING A MOLECULAR WEIGHT IN THE RANGE 2000-5000 AND (C) RUBBER OR PVC

[75] Inventors: Masasuke Harada, Kurume; Kouji Tsukamoto, Yanagawa; Tomohiro Etou, Onojo, all of Japan

[73] Assignee: Nippon Rubber Co., Ltd., Tokyo, Japan

[21] Appl. No.: 796,461

[22] Filed: Nov. 8, 1985

[30] Foreign Application Priority Data

Dec. 17, 1984 [JP] Japan .................. 59-266934

[51] Int. Cl.$^4$ ........................................ C08K 5/41
[52] U.S. Cl. ........................ 524/156; 524/251; 524/257; 524/377; 524/437; 524/567; 524/910; 524/911; 524/912
[58] Field of Search ............ 524/910, 911, 912, 913, 524/377, 156, 567, 251, 257, 437

[56] References Cited

U.S. PATENT DOCUMENTS

| | | | |
|---|---|---|---|
| Re. 28,070 | 7/1974 | Brindell et al. | 524/377 |
| 2,370,280 | 2/1945 | Yngve | 524/437 |
| 2,393,863 | 1/1946 | Myers | 524/156 |
| 2,579,375 | 12/1951 | Eisen | 524/156 |
| 2,723,246 | 11/1955 | Boyd et al. | 524/156 |
| 3,117,113 | 1/1964 | Tudor | 524/156 |
| 3,150,120 | 9/1964 | Perrins | 524/913 |
| 3,222,314 | 12/1965 | Wolinski | 524/377 |
| 3,223,664 | 12/1965 | Conlon | 524/377 |
| 3,399,178 | 8/1968 | Savides | 524/156 |
| 3,404,138 | 10/1968 | Adams | 524/156 |
| 3,933,709 | 1/1976 | Aron | 524/377 |
| 4,127,552 | 11/1978 | Bidston et al. | 524/913 |
| 4,268,583 | 5/1981 | Hendy | 524/910 |
| 4,315,081 | 2/1982 | Kobayashi et al. | 524/156 |
| 4,493,824 | 1/1985 | Abe | 424/70 |

FOREIGN PATENT DOCUMENTS

| | | | |
|---|---|---|---|
| 0018098 | 9/1963 | Japan | 524/913 |
| 0017401 | 8/1964 | Japan | 524/911 |
| 0889022 | 2/1962 | United Kingdom | 524/911 |
| 0662658 | 5/1963 | United Kingdom | 524/377 |
| 1139226 | 1/1969 | United Kingdom | 524/156 |
| 0279047 | 8/1970 | U.S.S.R. | 524/913 |

*Primary Examiner*—Herbert J. Lilling
*Attorney, Agent, or Firm*—Armstrong, Nikaido, Marmelstein & Kubovcik

[57] ABSTRACT

An antistatic material containing a base material which is rubber and/or polyvinyl cloride resin, to which are added a cationic quaternary ammonium salt and polyethylene glycol, and optionally aluminum hydroxide or calcium carbonate. The antistatic material has a low electric resistance and excellent thermal stability, and can be colored in any color.

5 Claims, No Drawings

ANTISTATIC MATERIAL COMPRISING (A) QUATERNARY AMMONIUM SALT (B) PEG HAVING A MOLECULAR WEIGHT IN THE RANGE 2000-5000 AND (C) RUBBER OR PVC

This invention relates to an antistatic material used in fields in which prevention of static electricity is desired, such as in the electronic industry, chemical industry, printing industry, textile industry, and hospitals. This invention is more particularly directed to an antistatic material suitable for a hot forming treatment.

In the production of an antistatic material for shoes, it is known to add a plasticizer such as a phthalic ester, sebacic ester, adipic ester, and phosphoric ester, a conductive powder such as carbon black, or a metallic powder such as silver powder and copper powder to a rubber such as natural rubber, styrene butadiene copolymer rubber (SBR), acrylonitrile butadiene copolymer rubber (NBR), and chloroprene rubber (CR) or to a polyvinyl chloride resin to reduce the electric resistance of the rubber or resin.

However, the change in the electric resistance obtained with the addition of a plasticizer of the ester series is limited, even when the amount of plasticizer is increased. The lowest possible resistance obtainable is $1 \times 10^{10}$ ohm. Accordingly, it is not possible to obtain in such materials an electric resistance in the range $1.0 \times 10^5 - 1.0 \times 10^8$ ohm, which is the standard established by JIS T 8103 for antistatic leather safety work shoes. Thus, a material containing ester plasticizers cannot be used in practice as an antistatic material.

By adding a conductive powder such as carbon black or a metallic powder, it is possible to bring the electric resistance of the material down to the standard level set by JIS T 8103, and make it suitable for use as an antistatic material. However, an inherent limitation in the use of conductive powders is that each powder imparts its characteristic color to the antistatic material, and thus it is not possible to prepare antistatic materials having any desired color. In addition, when a metallic powder is used, its large specific gravity causes the antistatic material to be very heavy.

It is also known to prevent a synthetic fiber, such as one made of polyamides and polyesters, from generating static electricity through friction or other action by treating the surface of such fibers with a cationic quaternary ammonium salt. If, however, a cationic quaternary ammonium salt is added to the foregoing rubber or a polyvinyl chloride resin to produce a material for a shoe sole, the resulting material has a low thermal stability and is liable to be decomposed by heat during the hot forming treatment of the shoe.

The object of this invention is to provide an antistatic material which is free from the foregoing defects, has an electric resistance conforming to the standard values set by JIS, from which charged static electricity can be removed rapidly, which can be colored in any desired tone of color and has a thermal stability suitable for a hot forming treatment. This material is prepared by adding a quaternary ammonium salt and polyethylene glycol to at least one base material selected from the group consisting of rubber and polyvinyl chloride resin.

The cationic quaternary ammonium salt decreases the electric resistance of the base material through ion dissociation. The polyethylene glycol accelerates the ion dissociation of the cationic quaternary ammonium salt and also prevents thermal decomposition of the ammonium salt.

The following rubbers can be used in this invention:

(1) a rubber containing in its chemical structure a polar group such as acrylonitrile butadiene rubber (NBR), acrylic rubber, chloroprene rubber (CR), and chlorosulfonated polyethylene rubber (CSM);

(2) a rubber composition prepared by adding to a non-polar rubber such as natural rubber (NR), styrene butadiene rubber (SBR), polyisoprene rubber (IR), polybutadiene rubber (BR), and isobutylene isoprene copolymer rubber a low molecular weight compound containing a polar group, for instance, an unsaturated compound such as acrylic amide, methacrylic amide, N-methylolacrylic amide, N-butoxymethyl acrylic amide, 4-aminopyridine, dicyanodiamide, imidazole, allylamine, diallylamine, and methyl methacrylate; and (3) a rubber composition prepared by modifying a non-polar rubber with a carboxyl group.

For increasing the electric conductivity of the material of this invention, it is preferable to use a rubber having a polar group of its own such as acrylonitrile butadiene rubber, and chloroprene rubber.

As the polyvinyl chloride resin, it is preferable to use a straight polymer with an average polymerization degree of 900-3,500, in order to avoid unnecessary lowering in workability during injection molding of the material, and to avoid an increase in hardness of the material.

The cationic quaternary ammonium salt added to the rubber or the polyvinyl chloride resin is prepared by reacting a tertiary amine and an alkylating agent such as methyl chloride. The cationic quaternary ammonium salt may be of a benzyl type, a methosulfate type, an ethanol addition type, or a type having at least two alkyl group.

The following commercial cationic quaternary ammonium salts may be used: "EREGAN FD" (made by Nihon Yushi K.K.), "CATANAC LS" (made by American Cyanamide Co.,), "KACHIMIN CSM9" (made by Yoshimura Yukagaku Kabushiki Kaisha), "ERETATTO M-65 CONC" (made by Ipposha Yushi Kogyo Sha), "TEKUSUNORU R5" (made by Nihon Nyukazai Kabushiki Kaisha).

The cationic quaternary ammonium salt is characterized by an ion dissociation which lowers the electric resistance and heightens the electric conductivity of the rubber or polyvinyl chloride to which such salt has been added. The amount of salt added is preferably 1-15 parts by weight to 100 parts by weight of the rubber or the polyvinyl chloride resin. If the amount added is below 1 part by weight, the electric resistance of the material is not significantly lowered, so that the resulting material has poor electric conductivity. If the amount added is above 15 parts by weight, the electric resistance is lowered thus improving the electric conductivity, but the viscosity is increased, resulting in a lowering of the workability of the material during the mixing and kneading steps in the case rubber is used, and during the injection molding steps in the case a polyvinyl chloride resin is used.

Polyethylene glycol is added for accelerating the ion dissociation of the cationic quaternary ammonium salt and for preventing the lowering in the workability of the material caused by the addition of a large amount of the salt. As a result of the addition of polyethylene glycol, the ion dissociation of the cationic quaternary ammonium salt is accelerated, and the lowering in the workability is prevented. It is preferable that the amount of polyethylene glycol added is 0.5–15 parts by weight to 100 parts by weight of the rubber or polyvinyl chloride resin. If the amount added is below 0.5 part by weight, no effect is obtained, and if the amount added is above 15 parts by weight, there is a tendency for the resulting material to have poorer physical properties such as tensile stress, tensile strength, and abrasion resistance, and for polyethylene glycol to bleed out unto the surface of the material and spoil the appearance of the product.

Additionally, it is preferable to use polyethylene glycol having an average molecular weight of 2,000–5,000. If the average molecular weight is below 2,000, the polyethylene glycol may bleed out unto the surface of the material and spoil the appearance of the product. If the molecular weight is above 5,000, there is a tendency for the dispersion of the polyethylene glycol into the rubber of the polyvinyl chloride resin to be lowered and for its effect as an ion dissociation agent for the cationic quaternary ammonium salt to be reduced.

Additionally in this invention, it is preferable that aluminum hydroxide be added to the rubber or the polyvinyl chloride resin. The aluminum hydroxide prevents the weakening of physical properties such as tensile stress, tensile strength, and abrasion resistance of the material obtained by adding the cationic quaternary ammonium salt and the polyethylene glycol to the rubber or polyvinyl chloride resin.

The amount of the aluminum hydroxide added is 3–20 parts by weight to 100 parts by weight of the rubber or the polyvinyl chloride resin. If the amount added is below 3 parts by weight, no effect is obtained. If the amount added is above 20 parts by weight, there is a tendency for the aluminum hydroxide itself to become ionized and cause the electric resistance of the material to be reduced beyond the necessary value. Further, calcium carbonate instead of aluminum hydroxide may be added to the rubber. The addition of calcium carbonate also prevents weakening of the physical properties of the material such as tensile stress, tensile strength, and abrasion resistance.

The proper amounts of rubber or polyvinyl chloride resin, cationic quaternary ammonium salt, and polyethylene glycol and, if necessary, aluminum hydroxide or calcium carbonate can be selected from the foregoing range for manufacturing a desired antistatic material.

An appropriate additive agent may also be used. For example, for improving the workability into a sheet or any other desired form of a rubber-based material, a vulcanizing agent such as sulfur or the like, a vulcanizing assisting agent such as stearic acid or the like, a crosslinking agent such as zinc white, magnesia or the like, a vulcanizing accelerating agent such as CM, TT or the like is added. For improving the workability of a material based on polyvinyl chloride resin, a plasticizer for plastics such as DOP, DHP, DOA or the like, a Ba-Zn stabilizing agent for plastics, or a high molecular weight acrylic work assisting agent or the like is added. The amount of each additive agent added is property determined in accordance with the nature and amount of the rubber or the polyvinyl chloride resin. Additionally, in the case of a rubber-based material, a combination of two or more rubbers selected from the foregoing varieties may be used. In the case of a material based on polyvinyl chloride resin, a combination of at least two kinds of resins with different average polymerization degrees may be used.

A mixture of the rubber and the polyvinyl chloride resin may also be used. In this case, the cationic quaternary ammonium salt, polyethylene glycol and optional aluminum hydroxide or calcium carbonate are added in their respective predetermined amounts to 100 parts by weight of the mixture of rubber and polyvinyl chloride resin.

In summary, when an antistatic material is prepared from rubber or a polyvinyl chloride resin, a cationic quaternary ammonium salt, polyethylene glycol and the optional aluminum hydroxide or calcium carbonate, the amount of each of those components being within the foregoing ranges, the ion dissociation of the cationic quaternary ammonium salt is accelerated by the polyethylene glycol, and the electric resistance of the material conforms to the standard level of JIS T 8103. Additionally, since the cationic quaternary ammonium salt, the polyethylene glycol and the optional aluminum hydroxide or calcium carbonate have little inherent colors, the resulting material can be colored in any desired color.

This invention will be explained with reference to the following embodying examples and comparative examples:

Compounding compositions for Embodying Examples 1, 2, 3, 4 and 5 and Comparative Example 1, each based on rubber were prepared. The components and their ratios in parts by weight are shown in Table 1.

TABLE 1

|  | Embodying Example 1 | Embodying Example 2 | Embodying Example 3 | Embodying Example 4 | Embodying Example 5 | Comparison Example 1 |
| --- | --- | --- | --- | --- | --- | --- |
| Acrylonitrile butadiene copolymer rubber (NBR) | 100 | 100 | 100 | — | 100 | 100 |
| Chloroprene rubber (CR) | — | — | — | 100 | — | — |
| Sulfur (vulcanizing agent) | 1.5 | 1.5 | 1.5 | — | 1.5 | 1.5 |
| Zinc white (crosslinking agent) (crosslinking agent) | 5 | 5 | 5 | 4 | 5 | 5 |
| Magnesia (crosslinking agent) | — | — | — | 5 | — | — |
| Stearic acid (vulcanization assisting agent) | 1 | 1 | 1 | 1 | 1 | 1 |
| DM (vulcanization accelerator) | 1.2 | 1.2 | 1.2 | — | 1.2 | 1.2 |
| TT (vulcanization accelerator) | 0.2 | 0.2 | 0.2 | — | 0.2 | 0.2 |
| D (vulcanization | — | — | — | 1 | — | — |

TABLE 1-continued

|  | Embodying Example 1 | Embodying Example 2 | Embodying Example 3 | Embodying Example 4 | Embodying Example 5 | Comparison Example 1 |
| --- | --- | --- | --- | --- | --- | --- |
| accelerator) |  |  |  |  |  |  |
| TS (vulcanization accelerator) | — | — | — | 0.5 | — | — |
| #22 (vulcanization accelerator) | — | — | — | 2 | — | — |
| Diisobutyl adipate (plasticizer) | 5 | 5 | 5 | 5 | 5 | 5 |
| Aluminium hydroxide | 12 | 12 | 12 | 12 | — | 12 |
| Calcium carbonate | — | — | — | — | 30 | — |
| Cationic quaternary ammonium salt ("Eretatto M-65 conc." made by Ipposha Yushi Kogyo K.K.) | 1.1 | 4 | 11 | 10 | 4 | 4 |
| Polyethylene glycol (average molecular weight 4000) | 0.5 | 4 | 11 | 10 | 4 | — |
| White titanium (pigment) | 5 | 5 | 5 | 5 | 5 | 5 |

Each of the compositions listed in Table 1 was mixed, kneaded and rolled in a conventional manner to give a sheet of 8 mm in thickness.

Additionally, compounding compositions for Embodying Examples 6, 7, 8, 9, 10, 11 12 and Comparative Example 2, each based on polyvinyl chloride resin were prepared. The components and their ratios in parts by weight are shown in Table 2.

Each of the compositions listed in Table 2 was mixed and subjected to an injection molding treatment in a conventional manner to form a foam sheet of 6 mm in thickness having pores or cells contained therein.

For each of Embodying Example 1-12, and Comparative Examples 1, 2, the electric resistance value and the static electricity eliminating effect were measured according to the following methods. The results are shown in Table 3.

TABLE 2

|  | Embodying Example 6 | Embodying Example 7 | Embodying Example 8 | Embodying Example 9 | Embodying Example 10 | Embodying Example 11 | Embodying Example 12 | Comparative Example 2 |
| --- | --- | --- | --- | --- | --- | --- | --- | --- |
| Polyvinyl chloride resin (Average polymerization degree 1050) | 100 | 100 | 100 | 100 | 100 | 100 | 100 | 100 |
| Dihexyle phthalate (Plasticizer) | 93 | 93 | 93 | 93 | 93 | 93 | 93 | 93 |
| Stabilizer for plastics | 3.6 | 3.6 | 3.6 | 3.6 | 3.6 | 3.6 | 3.6 | 3.6 |
| High molecular weight acrylic working assisting agent | 11 | 11 | 11 | 11 | 11 | 11 | 11 | 11 |
| White titanium (Pigment) | 4.4 | 4.4 | 4.4 | 4.4 | 4.4 | 4.4 | 4.4 | 4.4 |
| Azodicarboxylic amide (Foaming agent) | 0.88 | 0.88 | 0.88 | 0.88 | 0.88 | 0.88 | 0.88 | 0.88 |
| Cationic quaternary ammonium salt ("Eretatto M-65 conc." made by Ipposha Yushi Kogyo K.K.) | 1.1 | 3.3 | 3.3 | 11 | 11 | 11 | 3 | 3.3 |
| Polyethylene glycol (Average molecular weight 4000) | 11 | 0.55 | 11 | 11 | 11 | 11 | 3 | — |
| Aluminium hydroxide | 12.1 | 12.1 | 12.1 | 12.1 | 5.5 | 20 | 0 | 12.1 |

TABLE 3

|  | Embodying Example 1 | Embodying Example 2 | Embodying Example 3 | Embodying Example 4 | Embodying Example 5 | Comparative Example 1 | Embodying Example 6 |
| --- | --- | --- | --- | --- | --- | --- | --- |
| Electric resistance value (ohm) | $4.0 \times 10^7$ | $3.0 \times 10^6$ | $3.0 \times 10^5$ | $4.0 \times 10^7$ | $3.0 \times 10^6$ | $1.5 \times 10^8$ | $1.1 \times 10^6$ |
| Static electricity eliminating effect (second) | 0.1 | 0.1 | 0.1 | 0.1 | 0.1 | above 0.1 | 0.1 |

|  | Embodying Example 7 | Embodying Example 8 | Embodying Example 9 | Embodying Example 10 | Embodying Example 11 | Embodying Example 12 | Comparative Example 2 |
| --- | --- | --- | --- | --- | --- | --- | --- |
| Electric resistance value (ohm) | $7.5 \times 10^5$ | $3.5 \times 10^5$ | $6.0 \times 10^5$ | $7.0 \times 10^6$ | $1.5 \times 10^7$ | $8.0 \times 10^5$ | $1.5 \times 10^8$ |
| Static electricity eliminating effect (second) | 0.1 | 0.1 | 0.1 | 0.1 | 0.1 | 0.1 | above 0.1 |

TEST METHOD

For Electric Resistance Value:

According to JIS T 8103 (antistatic shoes).

For Static Electricity Eliminating Effect:

(1) Measuring apparatus: A current collecting type electric potential measuring apparatus KS 325 (made by Kasuga Denki K.K.).

(2) A polyethylene sheet of 2 mm in thickness charged with a static electricity voltage of 4.7 KV was brought into contact with each of the sheets of material of the foregoing examples which was placed on the floor. The period between contact time and the time when the static electricity voltage of the sheet is lowered to below 1.0 KV was measured.

The results in Table 3 confirm that the materials in Embodying Examples 1-12 have a lower electric resistance than the materials in Comparative Examples 1 and 2, and also meet the standard resistance level of JIS T 8103. Additionally, the results confirm that Embodying Examples 1-12 have a shorter static electricity eliminating time than Comparative Examples 1 and 2. Thus, charged static electricity can be removed more rapidly according to this invention.

Additionally, the materials of the Embodying Examples, each containing polyethylene glycol, have excellent thermal stability when subjected to hot forming treatment.

In each of the Embodying Examples, white titan was used as a coloring matter for obtaining a white material. However, a material of any desired color can be obtained by using the appropriate coloring matter.

Additionally, there was no substantial change in electric resistance between a foam material according to this invention which was prepared by adding a foaming agent, and the electric resistance of a non-foam material according to this invention. Thus, the use of a foaming agent does not cause any problems in the material of this invention.

According to this invention, an antistatic material is prepared by adding to rubber or polyvinyl chloride resin a cationic quaternary ammonium salt and polyethylene glycol, so that the electric resistance of the rubber or the polyvinyl chloride resin can be increased by the ion dissociation of the cationic quaternary ammonium salt, and at the same time the ion dissociation of the cationic quaternary ammonium salt is accelerated by the polyethylene glycol which also prevents heat decomposition of the salt. Consequently, the electric resistance of the material can be made to conform with the standard value established by JIS, and static electricity charged on the material can be rapidly eliminated. Additionally, the material of this invention has excellent thermal stability when it undergoes a hot forming treatment, and can be colored in any desired color.

We claim:

1. An antistatic material consisting essentially:
   (a) at least one base material selected from the group consisting of rubber and polyvinyl chloride resin,
   (b) a cationic quaternary ammonium salt, and
   (c) polyethylene glycol having an average molecular weight of 2000-5000.

2. An antistatic material as in claim 1, wherein the amount of the base material is 100 parts by weight, the amount of the cationic quaternary ammonium salt is 1-15 parts by weight, and the amount of polyethylene glycol is 0.5-15 parts by weight.

3. An antistatic material as in claim 1, further comprising aluminum hydroxide.

4. An antistatic material as in claim 2, further comprising 3-20 parts by weight of aluminum hydroxide.

5. An antistatic material as in any one of claims 1 or 2, wherein the rubber contains a polar group.

* * * * *